March 25, 1947.   A. WARMISHAM ET AL   2,418,001
OPTICAL OBJECTIVE
Filed July 2, 1943

Inventors
A. WARMISHAM &
C G WYNNE
By Emery Holcombe & Blair
Attorneys

Patented Mar. 25, 1947

2,418,001

UNITED STATES PATENT OFFICE 2,418,001

OPTICAL OBJECTIVE

Arthur Warmisham and Charles Gorrie Wynne,
Leicester, England

Application July 2, 1943, Serial No. 493,276
In Great Britain October 5, 1942

12 Claims. (Cl. 88—57)

This invention relates to an optical objective, corrected for spherical and chromatic aberrations, coma, astigmatism, field curvature and distortion, and comprising two simple divergent components located between two simple convergent components.

The invention has for its object to provide objectives of this kind corrected over a larger semi-angular field or for a higher aperture than hitherto, for example over a semi-angular field of 15° to 22° for apertures from F/3.5 to F/2.5 or higher, or over a semi-angular field of about 12° for apertures up to F/2 or higher.

A further object of the invention is to obtain a higher degree of correction for secondary spectrum than hitherto without sacrificing the corrections for astigmatism, field curvature and distortion, by choosing materials for the four components all having substantially the same relative partial dispersion. The relative partial dispersion, usually represented by $\theta$, may be defined by the mathematical expression $$\frac{n_g - n_e}{n_F - n_C}$$

where $n_C$, $n_e$, $n_F$ and $n_g$ are respectively the refractive indices for the C, e, F and g lines of the spectrum.

Another object of the invention is to provide a well-corrected objective of the above-mentioned kind, which can be employed not only with visible light, but also with ultraviolet rays down to 2000 Angstrom units.

Figure 1:
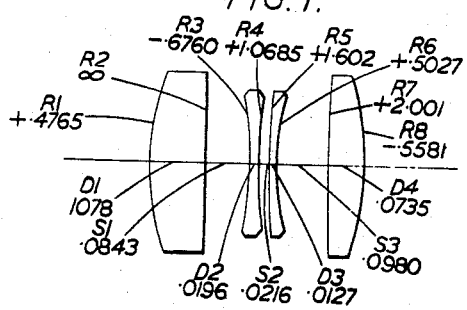
Figure 2:
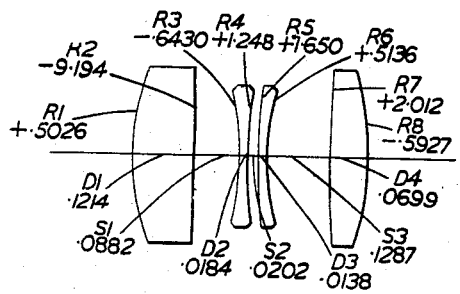
Figure 3:
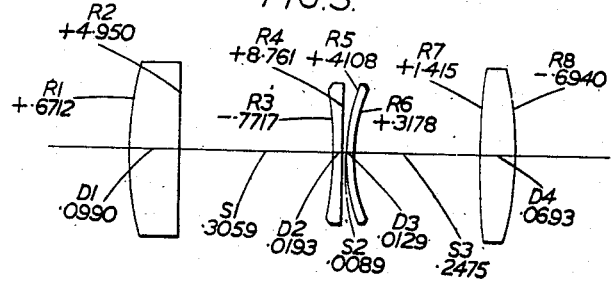
Figure 4:
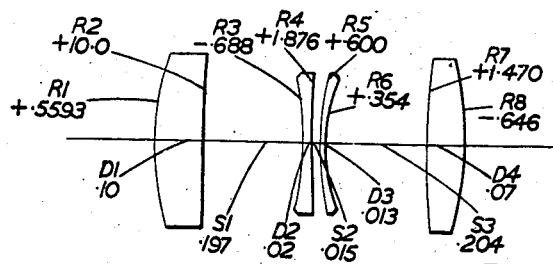

Still further objects of the invention will be apparent from the appended claims and from the following description of the accompanying drawings, in which Figures 1 to 4 respectively illustrate four convenient practical examples of objective according to the invention.

Numerical data for these four examples are given in the following tables, in which $R_1$, $R_2$, ... represent the radii of curvature of the individual lens surfaces counting from the front (that is the side of the longer conjugate) the positive sign indicating that the surface is convex to the front and the negative sign that it is concave thereto, $D_1$, $D_2$, ... represent the axial thicknesses of the individual elements, and $S_1$, $S_2$, $S_3$ represent the axial air spaces between the components. The tables also give the mean refractive indices $n_D$ for the D-line, the Abbé V numbers and the relative partial dispersions $\theta$ of the materials used for the various elements.

Example I

| | Equivalent focal length 1.000. Relative Aperture F/2.5 | | | | |
|---|---|---|---|---|---|
| Radius | Thickness or Air Separation | | Refractive Index $n_D$ | Abbé V Number | Relative Partial Dispersion |
| $R_1+.4765$ | $D_1$ | .1078 | 1.738 | 53.5 | .989 |
| $R_2 \infty$ | $S_1$ | .0843 | | | |
| $R_3-.6760$ | $D_2$ | .0196 | 1.651 | 33.5 | 1.060 |
| $R_4+1.0685$ | $S_2$ | .0216 | | | |
| $R_5+1.602$ | $D_3$ | .0127 | 1.651 | 33.5 | 1.060 |
| $R_6+.5027$ | $S_3$ | .0980 | | | |
| $R_7+2.001$ | $D_4$ | .0735 | 1.738 | 53.5 | .989 |
| $R_8-.5581$ | | | | | |

Example II

| | Equivalent focal length 1.000. Relative Aperture F/3.5 | | | | |
|---|---|---|---|---|---|
| Radius | Thickness or Air Separation | | Refractive Index $n_D$ | Abbé V Number | Relative Partial Dispersion |
| $R_1+.5026$ | $D_1$ | .1214 | 1.738 | 53.5 | .989 |
| $R_2-9.194$ | $S_1$ | .0882 | | | |
| $R_3-.6430$ | $D_2$ | .0184 | 1.641 | 29.9 | .985 |
| $R_4+1.248$ | $S_2$ | .0202 | | | |
| $R_5+1.650$ | $D_3$ | .0138 | 1.641 | 29.9 | .985 |
| $R_6+.5136$ | $S_3$ | .1287 | | | |
| $R_7+2.012$ | $D_4$ | .0699 | 1.738 | 53.5 | .989 |
| $R_8-.5927$ | | | | | |

Example III

| Equivalent focal length 1.000. Relative Aperture F/1.8 | | | | |
|---|---|---|---|---|
| Radius | Thickness or Air Separation | Refractive Index $n_D$ | Abbé V Number | Relative Partial Dispersion |
| $R_1+.6712$ | $D_1$ .0990 | 1.738 | 53.5 | .989 |
| $R_2+4.950$ | $S_1$ .3059 | | | |
| $R_3-.7177$ | $D_2$ .0193 | 1.6634 | 21.4 | .987 |
| $R_4+8.761$ | $S_2$ .0089 | | | |
| $R_5+.4108$ | $D_3$ .0129 | 1.6634 | 21.4 | .987 |
| $R_6+.3178$ | $S_3$ .2475 | | | |
| $R_7+1.415$ | $D_4$ .0693 | 1.738 | 53.5 | .989 |
| $R_8-.6940$ | | | | |

Example IV

| Equivalent focal length 1.000. Relative Aperture F/2.5 | | | | |
|---|---|---|---|---|
| Radius | Thickness or Air Separation | Refractive Index $n_D$ | Abbé V Number | Relative Partial Dispersion |
| $R_1+.5593$ | $D_1$ .10 | 1.738 | 53.5 | .989 |
| $R_2+10.0$ | $S_1$ .197 | | | |
| $R_3-.688$ | $D_2$ .02 | 1.641 | 30.0 | .985 |
| $R_4+1.876$ | $S_2$ .015 | | | |
| $R_5+.600$ | $D_3$ .013 | 1.6634 | 21.4 | .987 |
| $R_6+.354$ | $S_3$ .204 | | | |
| $R_7+1.470$ | $D_4$ .07 | 1.738 | 53.5 | .989 |
| $R_8-.646$ | | | | |

It will be noticed that, in all these examples, the numerical sum of $R_1$ and $R_8$ lies between 90% and 150% of the equivalent focal length, whilst the overall axial length of the objective lies between 40% and 85% of such equivalent focal length. As especially convenient narrower ranges within these limits may be mentioned from 90% to 130% for $R_1 + R_8$ and from 40% to 50% for the overall length, embracing Examples I and II, and from 100% to 150% for $R_1 + R_8$ and from 55% to 85% for the overall length, embracing Examples III and IV. The actual values of the numerical sum of $R_1$ and $R_8$ are respectively 1.0346, 1.0953, 1.365 and 1.205 times the equivalent focal length in the four examples, and the overall axial lengths are respectively .4175, .4606, .7633 and .62 times the equivalent focal length.

All four examples employ magnesium oxide crystal in the form known as β-magnesium oxide for both convergent outer components, and generally it is desirable that at least one, and preferably both, of these components should be made of material having mean refractive index between 1.70 and 1.80 and Abbé V number greater than 50.0 and are preferably less than 58.0.

In all the examples the two divergent inner components have mean refractive index between 1.62 and 1.75 and Abbé V number between 21.0 and 34.0. Examples III and IV in this respect come within the especially useful narrower range of 1.62 to 1.68 for mean refractive index and 21.0 to 31.0 for Abbé V number, whilst another useful range embracing Examples I and II is from 1.64 to 1.75 for mean refractive index and 27.0 to 34.0 for Abbé V number In Example I extra dense flint glass is used for the two inner components, whilst in the other three examples alkaline halide crystals are employed for these components. Thus Example II uses sodium bromide crystal for both components, Example III uses potassium iodide crystal for both components, and in Example IV one component is made of sodium bromide and the other of potassium iodide. Since the relative partial dispersions of sodium bromide crystal and potassium iodide crystal differ only slightly from that of magnesium oxide crystal, good correction for secondary spectrum is obtained in these three examples.

The use of these crystals for all the components of the objective as in Examples II, III and IV, has the further important advantage that the objective can be employed not only with visible light, but also with ultra violet rays down to 2000 Angstrom units. Since the relative partial dispersions of the alkaline halide crystals which may be used for the divergent components are slightly less than that of the magnesium oxide crystal of the convergent components, such crystal combinations give a small residual secondary spectrum which is the reverse of the usual shape, for the paraxial focussing distance thereby established for the central wavelength chosen for colour correction is a maximum and other wavelengths both longer and shorter, give smaller focussing distances. This is favourable for use with violet and ultra violet rays, for as the wavelength decreases, the secondary spherical aberration becomes increasingly relatively over-corrected and the shortening of the paraxial focussing distance thus makes it possible to arrange a compromise such that the position of the focal plane can remain constant for all wavelengths with slightly softer definition for the shorter wavelengths.

What we claim as our invention and desire to secure by Letters Patent is:

1. An optical objective, corrected for spherical and chromatic aberrations, coma, astigmatism, field curvature and distortion, and comprising four simple components in axial alignment of which the inner two are divergent and are each made of material having mean refractive index between 1.62 and 1.75 and Abbé V number between 21.0 and 34.0, whilst the outer two are convergent and are each made of material having mean refractive index between 1.70 and 1.80 and Abbé V number greater than 50.0, the numerical sum of the radii of curvature of the front surface of the front component and the rear surface of the rear component lying between 90% and 150% of the equivalent focal length of the objective, whilst the overall axial length of the objective between such two surfaces lies between 40% and 85% of such equivalent focal length.

2. An optical objective, corrected for spherical and chromatic aberrations, coma, astigmatism, field curvature and distortion, and comprising four simple components in axial alignment, of which the inner two are divergent and are each made of material having mean refractive index between 1.62 and 1.68 and Abbé V number between 21.0 and 31.0, whilst the outer two are convergent and are each made of material having mean refractive index between 1.70 and 1.80 and Abbé V number greater than 50.0 the numerical sum of the radii of curvature of the front surface of the front component and the rear surface of the rear component lying between 100% and 150% of the equivalent focal length of the objective, whilst the overall axial length of the objective between such two surfaces lies between 55% and 85% of such equivalent focal length.

3. An optical objective, corrected for spherical and chromatic abberations, coma, astigmatism, field curvature and distortion, and comprising four simple components in axial alignment, of which the inner two are divergent and are each made of material having mean refractive index between 1.64 and 1.75 and Abbé V number between 27.0 and 34.0 whilst the outer two are convergent and are each made of material having mean refractive index between 1.70 and 1.80 and Abbé V number greater than 50.0, the numerical sum of the radii of curvature of the front surface of the front component and the rear surface of the rear component lying between 90% and 130% of the equivalent focal length of the objective, whilst the overall axial length of the objective between such two surfaces lies between 40% and 50% of such equivalent focal length.

4. An optical objective as claimed in claim 1, in which the materials of which all four components are made have substantially the same relative partial dispersion.

5. An optical objective as claimed in claim 2, in which the divergent inner components are each made of an alkaline halide crystal, the materials of which all four components are made having substantially the same relative partial dispersion.

6. An optical objective as claimed in claim 3, in which the divergent inner components are each made of an alkaline halide crystal, the materials of which all four components are made having substantially the same relative partial dispersion.

7. An optical objective as claimed in claim 1, in which the divergent inner components are both made of sodium bromide crystal and the convergent outer components are both made of magnesium oxide crystal.

8. An optical objective as claimed in claim 1, in which the divergent inner components are both made of potassium iodide crystal, and the convergent outer components are both made of magnesium oxide crystal.

9. An optical objective as claimed in claim 1, in which the divergent inner components are both made of dense flint glass and the convergent outer components are both made of magnesium oxide crystal.

10. An optical objective having numerical data substantially as set forth in the following table:

| Equivalent focal length 1.000. Relative Aperture F/2.5 | | | | |
|---|---|---|---|---|
| Radius | Thickness or Air Separation | Refractive Index $n_D$ | Abbé V Number | Relative Partial Dispersion |
| $R_1+.4765$ | | | | |
| | $D_1$ .1078 | 1.738 | 53.5 | .989 |
| $R_2$ ∞ | | | | |
| | $S_1$ .0843 | | | |
| $R_3-.6760$ | | | | |
| | $D_2$ .0196 | 1.651 | 33.5 | 1.060 |
| $R_4+1.0685$ | | | | |
| | $S_2$ .0216 | | | |
| $R_5+1.602$ | | | | |
| | $D_3$ .0127 | 1.651 | 33.5 | 1.060 |
| $R_6+.5027$ | | | | |
| | $S_3$ .0980 | | | |
| $R_7+2.001$ | | | | |
| | $D_4$ .0735 | 1.738 | 53.5 | .989 |
| $R_8-.5581$ | | | | | in which $R_1$, $R_2$, ... represent the radii of curvature of the individual lens surfaces counting from the front (that is the side of the longer conjugate) the positive sign indicating that the surface is convex to the front and the negative sign that it is concave thereto, $D_1$, $D_2$, ... represent the axial thicknesses of the individual elements, and $S_1$, $S_2$, $S_3$, represent the axial air spaces between the components.

11. An optical objective having numerical data substantially as set forth in the following table:

| Equivalent focal length 1.000. Relative Aperture F/3.5 | | | | |
|---|---|---|---|---|
| Radius | Thickness or Air Separation | Refractive Index $n_D$ | Abbé V Number | Relative Partial Dispersion |
| $R_1+.5026$ | | | | |
| | $D_1$ .1214 | 1.738 | 53.5 | .989 |
| $R_2-9.194$ | | | | |
| | $S_1$ .0882 | | | |
| $R_3-.6430$ | | | | |
| | $D_2$ .0184 | 1.641 | 29.9 | .985 |
| $R_4+1.248$ | | | | |
| | $S_2$ .0202 | | | |
| $R_5+1.650$ | | | | |
| | $D_3$ .0138 | 1.641 | 29.9 | .985 |
| $R_6+.5136$ | | | | |
| | $S_3$ .1287 | | | |
| $R_7+2.012$ | | | | |
| | $D_4$ .0699 | 1.738 | 53.5 | .989 |
| $R_8-.5927$ | | | | | in which $R_1$, $R_2$, ... represent the radii of curvature of the individual lens surfaces counting from the front (that is the side of the longer conjugate) the positive sign indicating that the surface is convex to the front and the negative sign that it is concave thereto, $D_1$, $D_2$, ... represent the axial thicknesses of the individual elements, and $S_1$, $S_2$, $S_3$, represent the axial air spaces between the components.

12. An optical objective having numerical data substantially as set forth in the following table:

| Equivalent focal length 1.000. Relative Aperture F/1.8 | | | | |
|---|---|---|---|---|
| Radius | Thickness or Air Separation | Refractive Index $n_D$ | Abbé V Number | Relative Partial Dispersion |
| $R_1+.6712$ | | | | |
| | $D_1$ .0990 | 1.738 | 53.5 | .989 |
| $R_2+4.950$ | | | | |
| | $S_1$ .3059 | | | |
| $R_3-.7177$ | | | | |
| | $D_2$ .0193 | 1.6634 | 21.4 | .987 |
| $R_4+8.761$ | | | | |
| | $S_2$ .0089 | | | |
| $R_5+.4108$ | | | | |
| | $D_3$ .0129 | 1.6634 | 21.4 | .987 |
| $R_6+.3178$ | | | | |
| | $S_3$ .2475 | | | |
| $R_7+1.415$ | | | | |
| | $D_4$ .0693 | 1.738 | 53.5 | .989 |
| $R_8-.6940$ | | | | | in which $R_1$, $R_2$, ... represent the radii of curvature of the individual lens surfaces counting from the front (that is the side of the longer conjugate) the positive sign indicating that the surface is convex to the front and the negative sign that it is concave thereto, $D_1$, $D_2$, ... represent the axial thicknesses of the individual elements, and $S_1$, $S_2$, $S_3$, represent the axial air spaces between the components.

ARTHUR WARMISHAM.
CHARLES GORRIE WYNNE.

REFERENCES CITED

The following references are of record in the file of this patent:

(Other references on following page)

UNITED STATES PATENTS

| Number | Name | Date |
|---|---|---|
| 1,937,168 | Repp | Nov. 28, 1933 |
| 1,361,207 | Warmisham | Dec. 7, 1920 |
| 1,565,205 | Rudolph | Dec. 8, 1925 |
| 2,085,437 | Michelssen | June 29, 1937 |
| 1,541,407 | Spannenberg | June 9, 1925 |
| 981,412 | Graf | Jan. 10, 1911 |
| 2,308,007 | Herzberger et al. | Jan. 12, 1943 |
| 2,252,682 | Aklin | Aug. 19, 1941 |

OTHER REFERENCES

Hackh, "Hackh's Chemical Dictionary," 2nd ed., 1937, pp. 558, 746, 856.